United States Patent [19]
Amano et al.

[11] Patent Number: 5,212,265
[45] Date of Patent: May 18, 1993

[54] METHOD FOR RECOVERING UNREACTED MONOMERS AFTER PREPARATION OF VINYLIC POLYMER

[75] Inventors: Tadashi Amano, Kanagawa; Minoru Shigemitsu, Ibaragi, both of Japan

[73] Assignee: Shin-Etsu Chemical Co., Ltd., Japan

[21] Appl. No.: 859,814

[22] Filed: Mar. 30, 1992

[30] Foreign Application Priority Data

Apr. 8, 1991 [JP] Japan ................................. 3-75222

[51] Int. Cl.$^5$ .............................................. C08F 2/16
[52] U.S. Cl. .................................. 526/71; 526/344.2; 528/501
[58] Field of Search ................. 526/344.2, 71; 528/501

[56] References Cited

U.S. PATENT DOCUMENTS

| | | | |
|---|---|---|---|
| 4,205,149 | 5/1980 | Cich et al. | 528/501 |
| 4,694,055 | 9/1987 | Itoh et al. | 526/344.2 |

*Primary Examiner*—Joseph L. Schofer
*Assistant Examiner*—David Wu
*Attorney, Agent, or Firm*—Parkhurst, Wendel & Rossi

[57] ABSTRACT

A method for recovering unreacted monomers during preparation of a vinylic polymer comprises the steps of polymerizing a vinyl monomer in an aqueous medium in a polymerizer and then recovering unreacted monomers from the polymerization system, wherein a gas evacuation rate per unit charge weight of the monomer is controlled to the range of from 60 to 300 Nm$^3$/hr per ton of the monomer from the initiation of the monomer recovery till the pressure in the polymerizer reaches 2.5 kg/cm$^2$G and a superficial gas linear velocity is reduced to a level of not more than 0.008 m/sec when the pressure in the polymerizer reaches 2.5 kg/cm$^2$G. The method makes it possible to recover unreacted monomers quickly without causing carrying over of polymer particles formed and is effective to maintain high quality of vinylic polymers produced.

8 Claims, No Drawings

METHOD FOR RECOVERING UNREACTED MONOMERS AFTER PREPARATION OF VINYLIC POLYMER

BACKGROUND OF THE INVENTION

The present invention relates to a method for recovering unreacted monomers, for instance, after suspension polymerization of a vinyl chloride monomer.

Regarding the preparation of vinyl chloride polymers, it has been desired to speed up polymerization cycles for the purpose of enhancing the productivity thereof and as a part of the speeding up of the cycles, it has been tried to increase the rate of recovery of unreacted monomers and to thus speed up the rate of recovery.

However, a simple improvement in the rate of recovery of the unreacted monomers is accompanied by foaming of a polymer slurry and in the worst case, foams containing the polymer even reach the gas phase zone in a polymerizer and pipings which are connected thereto. This leads to formation of scale and generation of fish eyes during the subsequent preparation of polymers due to contamination with the polymer particles remaining in the polymerizer and this in turn results in the reduction of quality of the polymers subsequently prepared. Moreover, in the worst case, the polymer slurry is carried over even to lines for recovering unreacted monomers. As a result, the yield of the polymer is substantially lowered and the recovery lines are sometimes clogged. For this reason, the rate of recovering unreacted monomers is selected in such a manner that foams of a polymer slurry do not fill the gas phase zone in the polymerizer and such a choice requires high skill.

However, the foaming condition of a polymer slurry while recovering unreacted monomers is greatly influenced by the pressure in a polymerizer and the composition of a polymerization system and, therefore, it has been very difficult to determine the optimum rate of recovery for all of the products and kinds thereof. Under these circumstances, there has been a demand for the development of a method for recovering unreacted monomers while inhibiting carrying over of a polymer slurry through foaming during recovering the unreacted monomers and shortening the time required for the evacuation of a polymerizer.

SUMMARY OF THE INVENTION

Accordingly, an object of the present invention is generally to solve the foregoing problems associated with the conventional methods and more specifically to provide a method for recovering unreacted monomers while preparing vinylic polymers, which can recover the unreacted monomers quickly without causing carrying over of polymer particles formed and which is effective to maintain high quality of the vinylic polymer products.

The present inventors have conducted intensive studies to solve the foregoing problems associated with the conventional techniques, have strictly observed foaming of a polymer slurry while recovering unreacted monomers, have accordingly found out that the amount of foams generated is largely dependent upon the pressure in a polymerizer and that the amount of foams generated is substantially increased when the pressure in the polymerizer is reduced to not more than 2.5 kg/cm$^2$G and thus have completed the present invention on the basis of the foregoing findings.

The foregoing object of the present invention can effectively be accomplished by providing a method for recovering unreacted monomers during preparation of a vinylic polymer which comprises the steps of polymerizing a vinyl monomer in an aqueous medium in a polymerizer and then recovering unreacted monomers from the polymerization system, wherein a gas evacuation rate per unit charge weight of the monomer is controlled in a range of from 60 to 300 Nm$^3$/hr per ton of the monomer from the initiation of the monomer recovery till the pressure in the polymerizer reaches 2.5 kg/cm$^2$G and a superficial gas linear velocity of the monomer is reduced to a level of not more than 0.008 m/sec at an instance when the pressure in the polymerizer reaches 2.5 kg/cm$^2$G.

DESCRIPTION OF THE PREFERRED EMBODIMENTS

The present invention will hereinafter be described in detail.

The method of the present invention may be applied to any mode of polymerization such as suspension polymerization and emulsion polymerization. For instance, the suspension polymerization is particularly preferred for the polymerization of vinyl chloride.

Examples of vinylic monomers used in the polymerization are vinyl chloride monomer and mixtures of not less than 50% by weight of vinyl chloride monomer and vinyl monomers (comonomers) other than vinyl chloride copolymerizable with the latter.

Specific examples of other vinyl monomers (comonomers) copolymerizable with vinyl chloride are vinyl esters such as vinyl acetate and vinyl propionate; (meth)acrylates such as methyl (meth)acrylate and ethyl (meth)acrylate; olefins such as ethylene and propylene; vinyl ethers such as lauryl vinyl ether and isobutyl vinyl ether; and maleic anhydride, acrylonitrile, styrene and vinylidene chloride. These monomers other than vinyl chloride may be used alone or in any combination.

In the polymerization step of the method according to the present invention, there may be used polymerization initiators and dispersing agents currently used in the preparation of vinyl chloride polymers.

The polymerization initiators may be, for instance, oil-soluble catalysts and water-soluble catalysts conventionally used in the polymerization of vinyl chloride.

Specific examples of oil-soluble catalysts include peroxydicarbonate compounds such as diisopropyl peroxydicarbonate, di-2-ethylhexyl peroxydicarbonate and diethoxyethyl peroxydicarbonate; peroxy ester compounds such as t-butyl peroxyneodecanate, t-butyl peroxypivalate, t-hexyl peroxypivalate, α-cumyl peroxyneodecanate; peroxides such as acetyl cyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-methoxy-2,4-dimethylvaleronitrile).

Specific examples of water-soluble catalysts include potassium persulfate, ammonium persulfate, hydrogen peroxide and cumene hydroperoxide. These catalysts may be used alone or in combination.

The dispersing agents for dispersing monomers in an aqueous medium may be any conventionally known one and specific examples thereof include water-soluble cellulose ethers such as methyl cellulose, ethyl cellulose, hydroxyethyl cellulose, hydroxypropyl cellulose and hydroxypropylmethyl cellulose; water-soluble polymers such as gelatin; oil-soluble emulsifying agents such as sorbitan monolaurate, sorbitan trioleate, sorbitan monostearate, glycerin tristearate and ethylene oxide/propylene oxide block copolymers; and water-soluble emulsifying agents such as polyoxyethylene sorbitan monolaurate, polyoxyethylene glycerin oleate and sodium laurylsulfate. Examples of dispersing agents usable in the present invention further include acrylic acid polymers, calcium carbonate, calcium phosphate and sodium dodecylbenzenesulfonate. These dispersing agents can be used alone or in any combination.

In the polymerization step, solvents and ingredients such as an aqueous medium, vinyl chloride monomer, other comonomers, a suspending agent, a dispersing agent and a polymerization initiator may be charged in a polymerizer in the usual manner and the compounding ratio of these ingredients and the conditions for the polymerization such as polymerization temperature may likewise be selected in the usual manner.

In the method of the invention, the polymerization system may optionally comprise other additives currently used in the polymerization of vinyl chloride, for instance, polymerization regulators, chain transfer agents, pH adjusting agents, agents for improving gelation, antistatic agents, crosslinking agents, stabilizers, fillers, antioxidizing agents, buffering agents and scale inhibitors, according to need.

It is very important in the method of this invention that a gas evacuation rate per unit charge weight of a monomer is controlled in the range of from 60 to 300 $Nm^3/hr$ per ton of monomer and preferably 60 to 150 $Nm^3/hr$ per ton of monomer, from the initiation of the monomer recovery till the pressure in the polymerizer reaches 2.5 $kg/cm^2G$. This is because if the gas evacuation rate is less than 60 $Nm^3/hr$ per ton of monomer, the recovery of unreacted monomers requires a long time and the process becomes less economical, while if it exceeds 300 $Nm^3/hr$ per ton of monomer, the recovery of unreacted monomers is accompanied by undesired carrying over of the polymer slurry. It is also very important in the invention that a superficial gas linear velocity is reduced to a level of not more than 0.008 m/sec, preferably not more than 0.005 m/sec, when the pressure in the polymerizer reaches 2.5 $kg/cm^2G$. This is because if the superficial gas linear velocity exceeds 0.008 m/sec, foams are severely generated and this in turn causes carrying over of the polymer slurry.

In the method for recovering unreacted monomers according to the present invention, the maximum superficial gas linear velocity can be set to a relatively high level during the term from the initiation of the recovery of the unreacted monomer till the internal pressure of the polymerizer is reduced to 2.5 $kg/cm^2G$ and, therefore, the unreacted monomers can relatively quickly be recovered.

If the internal pressure of the polymerizer reaches 2.5 $kg/cm^2G$, the vinyl chloride monomers condensed in micropores of vinyl chloride polymer particles formed cause bumping and are liable to cause foaming. However, such foaming of the polymer slurry formed can be suppressed by controlling the superficial gas linear velocity of the unreacted monomers to a level of not more than 0.008 m/sec at this stage and as a result, any carrying over of polymers can be inhibited.

The methods for recovering unreacted monomers during polymerization of vinylic monomers according to the present invention will hereinafter be explained in more detail with reference to the following non-limitative working Examples.

To a stainless steel polymerizer having an internal volume of 1,000 l (inner diameter = 0.85 m), there were charged 480 kg of deionized water, 210 g of a partially saponified polyvinyl alcohol and 140 g of 2-ethylhexyl peroxydicarbonate, followed by evacuation of the polymerizer and addition of 350 kg of vinyl chloride monomer. The temperature of the contents of the polymerizer was raised up to 57° C. with stirring to initiate polymerization. The polymerization was stopped when the pressure in the polymerizer was reduced to 6.5 $kg/cm^2G$ and unreacted monomers were recovered. The recovery of the unreacted monomers was carried out in the following manner.

EXAMPLE 1

The gas evacuation rate of the unreacted monomers was set to 100 $Nm^3/hr$ per ton of monomer till the internal pressure of the polymerizer was reduced from the initial value, 6.5 $kg/cm^2G$, to 2.5 $kg/cm^2G$ to recover the unreacted monomers and when the internal pressure of the polymerizer was reduced to 2.5 $kg/cm^2G$, the superficial gas linear velocity of the unreacted monomer was set to 0.003 m/sec to recover the unreacted monomers. The superficial gas linear velocity was calculated from the flow rate determined by a flowmeter disposed in the course of a piping for recovering the unreacted monomers and the temperature of the contents of the polymerizer and the pressure therein. The control of the superficial gas linear velocity was performed by opening and closing a valve positioned in the course of the piping for recovering the unreacted monomer.

The unreacted monomer was recovered in the manner described above and it took 30 minutes for the complete recovery of the unreacted monomer. In this respect, there was not observed any polymer slurry carried over to the gas phase zone in the polymerizer and the lines for recovering the unreacted monomer.

EXAMPLE 2

The same procedures used in Example 1 were repeated except that when the internal pressure of the polymerizer was reduced to 2.5 $kg/cm^2G$, the superficial gas linear velocity of the unreacted monomer was set to 0.006 m/sec to recover the same. It took 23 minutes for the complete recovery of the unreacted monomer and likewise there was not observed any polymer slurry carried over to the gas phase zone in the polymerizer and the lines for recovering the unreacted monomer.

COMPARATIVE EXAMPLE 1

The gas evacuation rate of the unreacted monomer was set to 90 $Nm^3/hr$ per ton of monomer till the internal pressure of the polymerizer was reduced from the initial value, 6.5 $kg/cm^2G$, to 2.5 $kg/cm^2G$ to recover the unreacted monomer and when the internal pressure of the polymerizer was reduced to 2.5 $kg/cm^2G$, the superficial gas linear velocity of the unreacted monomer was set to 0.009 m/sec to recover the same. As a result, it took 21 minutes for the recovery of the unreacted monomer. However, there was observed severe foaming, the polymer slurry was scattered on the whole surface of the gas phase zone in the polymerizer and a part of the lines for recovering the monomers were clogged with vinyl chloride.

COMPARATIVE EXAMPLE 2

The gas evacuation rate of the unreacted monomers was set to 17.7 Nm$^3$/hr per ton of monomer till the internal pressure of the polymerizer was reduced from the initial value, 6.5 kg/cm$^2$G, to 2.5 kg/cm$^2$G to recover the monomer and when the internal pressure of the polymerizer was reduced to 2.5 kg/cm$^2$G, the superficial gas linear velocity of the unreacted monomer was set to 0.003 m/sec to recover the same. Any polymer slurry was not carried over to the gas phase zone in the polymerizer and the lines for recovering the monomer, but it took 85 minutes for the recovery of the unreacted monomer.

As has been explained above in detail, the recovery rate of unreacted monomers is appropriately controlled in the method for recovering the unreacted monomer during the preparation of vinylic polymers according to the present invention and accordingly, the method makes it possible to reduce the time required for the recovery of the unreacted monomer and to efficiently produce vinylic polymers.

Moreover, any foaming of a polymer slurry can be inhibited during the recovery and polymers formed are not carried over to a gas phase zone in a polymerizer, pipings or the like. Therefore, any formation of scale and generation of fish eyes are not observed during the subsequent preparation of polymers due to contamination with polymer particles remaining in the polymerizer and accordingly the method is effective for maintaining the quality of polymers prepared.

It should also be understood that the foregoing relates to only the scope of the invention is defined by the appended claims rather than by the description preceding them, and all changes that fall within meets and bounds of the claims, or equivalence of such meets and bounds are therefore intended to embraced by the claims.

What is claimed is:

1. A method for recovering unreacted monomers during preparation of a vinylic polymer which comprises the steps of polymerizing a vinyl monomer in an aqueous medium in a polymerizer and then recovering unreacted monomers from the polymerization system, wherein a gas evacuation rate per unit charge weight of the monomer is controlled to the range of from 60 to 300 Nm$^3$/hr per ton of the monomer from the initiation of the monomer recovery till the pressure in the polymerizer reaches 2.5 kg/cm$^2$G and a superficial gas linear velocity is reduced to a level of not more than 0.008 m/sec when the pressure in the polymerizer reaches 2.5 kg/cm$^2$G.

2. The method of claim 1 wherein the vinylic monomer is a mixture of not less than 50% by weight of vinyl chloride monomer and at least one vinyl monomer copolymerizable with vinyl chloride.

3. The method of claim 2 wherein the vinyl monomer copolymerizable with vinyl chloride is at least one member selected from the group consisting of vinyl esters, (meth)acrylates, olefins, vinyl ethers, maleic anhydride, acrylonitrile, styrene and vinylidene chloride.

4. The method of claim 1 wherein the vinyl monomer is vinyl chloride.

5. The method of claim 1 wherein the polymerization system is a suspension polymerization system.

6. The method of claim 1 wherein the superficial gas linear velocity of the monomer is controlled by opening and closing a valve disposed in the course of a piping for recovering the monomer.

7. The method of claim 1 wherein the evacuation rate per unit charge weight of the monomer ranges from 60 to 150 Nm$^3$/hr per ton of the monomer.

8. The method of claim 1 wherein the superficial gas linear velocity is not more than 0.005 m/sec.

* * * * *